(12) United States Patent
Oda (10) Patent No.: US 11,403,841 B2
(45) Date of Patent: Aug. 2, 2022

(54) INFORMATION PROCESSING APPARATUS FOR ANALYZING IMAGE DATA, CONTROL METHOD FOR THE SAME, AND STORAGE MEDIUM

(71) Applicant: CANON KABUSHIKI KAISHA, Tokyo (JP)

(72) Inventor: Hirotaka Oda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 394 days.

(21) Appl. No.: 16/782,152

(22) Filed: Feb. 5, 2020

(65) Prior Publication Data
US 2020/0250451 A1 Aug. 6, 2020

(30) Foreign Application Priority Data

Feb. 6, 2019 (JP) .............................. JP2019-019862

(51) Int. Cl.
| | |
|---|---|
| *G06N 20/00* | (2019.01) |
| *G06N 5/04* | (2006.01) |
| *G06V 10/94* | (2022.01) |
| *G06K 9/62* | (2022.01) |

(52) U.S. Cl.
CPC ........... *G06V 10/95* (2022.01); *G06K 9/6256* (2013.01); *G06K 9/6296* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,740,951 B2 | 8/2017 | Vrabete | |
| 11,146,710 B2 * | 10/2021 | Maeda | ................. H04N 1/6002 |
| 2020/0242154 A1 * | 7/2020 | Haneda | ................ G06V 10/255 |

FOREIGN PATENT DOCUMENTS

JP 2017-054491 A 3/2017

* cited by examiner

*Primary Examiner* — Dov Popovici
(74) *Attorney, Agent, or Firm* — Venable LLP

(57) ABSTRACT

An information processing apparatus capable of communicating with an external device includes an analysis unit configured to analyze image data and to acquire a second analysis result using a second inference model that is less accurate than a first inference model of an external device when communication with the external device is not possible, a transmission unit configured to transmit the image data to the external device when communication with the external device is possible, and an acquisition unit configured to acquire, from the external device, a first analysis result obtained by analyzing, using the first inference model, the image data transmitted to the external device by the transmission unit. The first inference model and the second inference model are generated by performing machine learning.

13 Claims, 9 Drawing Sheets

| MANAGEMENT NUMBER 701 | AREA 702 | SIMPLE INFERENCE RESULT 703 | DETAILED INFERENCE RESULT 704 |
|---|---|---|---|
| 1 | 200,300,1000,1000 | CAR | TAXI — 705 |
| 2 | 1400,700,1800,1400 | PERSON | MALE, ADULT — 706 |

INFORMATION PROCESSING APPARATUS FOR ANALYZING IMAGE DATA, CONTROL METHOD FOR THE SAME, AND STORAGE MEDIUM

CROSS-REFERENCE TO RELATED APPLICATIONS

This application claims the benefit of Japanese Patent Application No. 2019-019862, filed Feb. 6, 2019, which is hereby incorporated by reference herein in its entirety.

BACKGROUND OF THE INVENTION

Field of the Invention

The present invention relates to an information processing apparatus that analyzes image data, a control method for the information processing apparatus, and a storage medium.

Description of the Related Art

A technology is used in which an information processing apparatus such as a digital camera or a mobile terminal analyzes image data in cooperation with a cloud server or the like. As a related technology, for example, a technology of Patent Literature 1 is proposed. In the technology of Japanese Laid-Open Patent Publication (kokai) No. 2017-54491, a server identifies a subset of objects that are expected to be recognized by each of edge devices. The server generates a reduced object recognition database for each edge device that includes a corresponding subset of a plurality of images. Each edge device monitors a plurality of device events and performs object recognition using the corresponding reduced object recognition database in response to the device events.

In the image analysis processing, there is a method for analyzing image data by learning image data and constructing an inference model based on a learning result. In order to learn image data and to construct an inference model, an information processing apparatus is required to have a high processing capability. In addition, long learning time is required to improve the accuracy of image data analysis, and thus the information processing apparatus is required to have a higher processing capability. In this regard, in the case of an information processing apparatus with limited processing capability such as a digital camera or a mobile terminal, it is difficult to meet the above requirements. Therefore, it is conceivable that image data learning and image data analysis based on an inference model is performed by an external device (such as a cloud server) having a high processing capability, and an information processing apparatus such as a digital camera and a mobile terminal acquires an analysis result from the external device. However, in the above configuration, when a network is disconnected, communication between an information processing apparatus and an external device cannot be performed, and thus the information processing apparatus cannot acquire an analysis result of image data.

SUMMARY OF THE INVENTION

The present invention provides an information processing apparatus that can acquire an analysis result of image data even when communication with an external device is not possible, a control method, and a program for the information processing apparatus.

Accordingly, the present invention provides an information processing apparatus capable of communicating with an external device, the apparatus including an analysis unit configured to analyze image data and to acquire a second analysis result using a second inference model that is less accurate than a first inference model of an external device when communication with the external device is not possible, a transmission unit configured to transmit the image data to the external device when communication with the external device is possible, and an acquisition unit configured to acquire, from the external device, a first analysis result obtained by analyzing, using the first inference model, the image data transmitted to the external device by the transmission unit, wherein the first inference model and the second inference model are generated by performing machine learning.

According to the present invention, an analysis result of image data can be acquired even when communication with an external device is not possible.

Further features of the present invention will become apparent from the following description of exemplary embodiments (with reference to the attached drawings).

DESCRIPTION OF THE EMBODIMENTS

Figure 1:
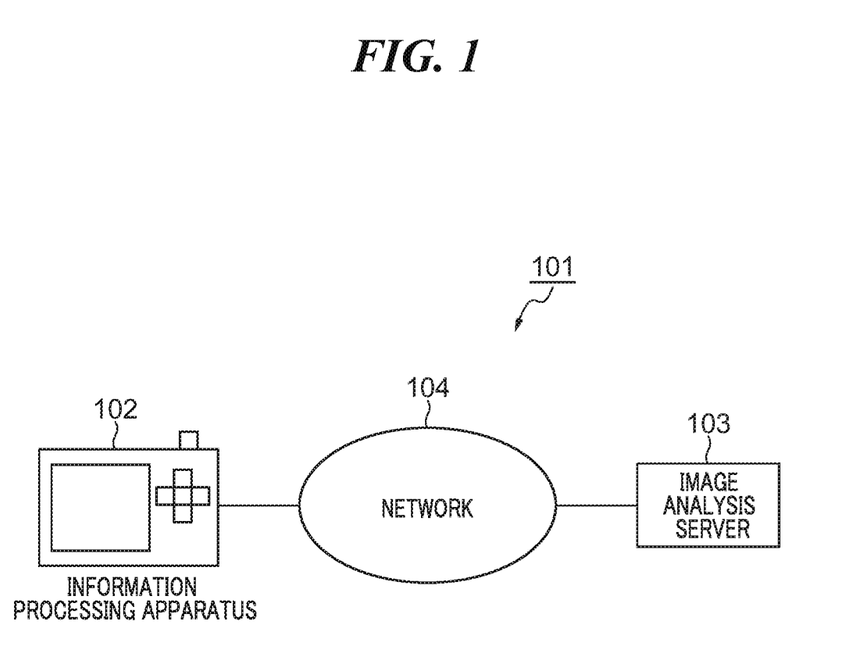
FIG. 1 is a diagram showing a configuration example of a system according to a present embodiment.

Hereafter, an embodiment will be described with reference to the drawings. FIG. 1 is a diagram showing a configuration example of a system 101 according to the present embodiment. In the system 101, an information processing apparatus 102 and an image analysis server 103 are connected via a network 104. The information processing apparatus 102 is a device such as a digital camera, a smart device, or a mobile terminal. The information processing apparatus 102 has an image pickup function. For example, the information processing apparatus 102 may be a smartphone having an image pickup function and a communication function. The image analysis server 103 is an external device that analyzes image data. The image analysis server 103 may be a cloud server, for example. The image analysis server 103 has a higher processing capability than the information processing apparatus 102.

The information processing apparatus 102 has a standard protocol capable of transferring information via the network 104. The information processing apparatus 102 accesses the image analysis server 103 using a protocol such as HTTP. The information processing apparatus 102 transmits image data or information including a part of the image data (information created in a description language such as XML) to the image analysis server 103, and information created in a description language such as HTML or XML is obtained and analyzed. The information processing apparatus 102 can assist in, for example, tagging and displaying the type and name of the subject based on the analyzed information. The information processing apparatus 102 can be used as a part of shooting process data for selecting a shooting mode or a part of processing data of shot image data.

In the embodiment, it is assumed that the information processing apparatus 102 encrypts information for performing image analysis when communicating with the image analysis server 103 via the network 104. As an encryption method, for example, SSL can be applied. Further, it is assumed that the image analysis server 103 can transmit and receive information for performing image analysis only with the authorized information processing apparatus 102. The restrictions such as encryption described above are not essential. The information processing apparatus 102 and the image analysis server 103 are not always communicably connected. For example, the communication state may change depending on the usage environment of the information processing apparatus 102. There are cases that the information processing apparatus 102 can connect to the network 104, and there are cases that the information processing apparatus 102 is disconnected from the network 104. When the information processing apparatus 102 is disconnected from the network 104, the information processing apparatus 102 cannot communicate with the image analysis server 103.

Figure 2:
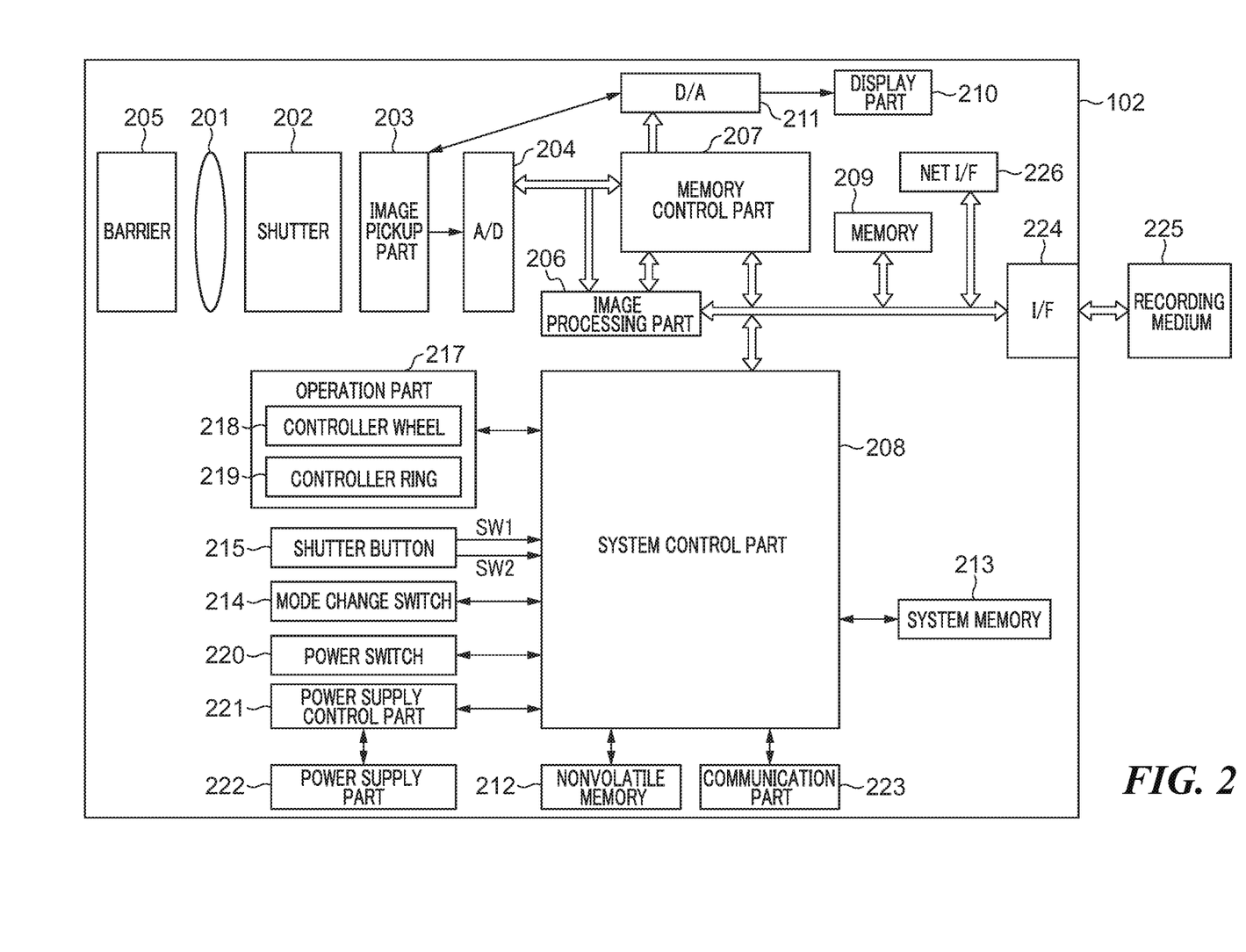
FIG. 2 is a functional block diagram of an information processing apparatus according to the present embodiment.

FIG. 2 is a functional block diagram of the information processing apparatus 102 of the present embodiment. The information processing apparatus 102 according to the present embodiment has an image pickup function. As described above, the information processing apparatus 102 may be an image pickup apparatus such as a digital camera. However, the information processing apparatus 102 does not need to have a function of binoculars or a telescope and may be an apparatus that displays an analysis result of image data on a finder, a screen, or the like. In FIG. 2, an image pickup lens 201 is a lens including a focus lens, and the like. The image pickup lens 201 may include a lens other than the focus lens. A shutter 202 has a diaphragm function. An image pickup part 203 as an image pickup unit includes a CCD, a CMOS element, or the like that converts an optical image into an electrical signal. An A/D converter 204 converts an analog signal output from the image pickup part 203 into a digital signal. In FIG. 2, the A/D converter 204 is shown as "A/D". A barrier 205 covers the image pickup lens 201 and the like, thereby the image pickup system including the image pickup lens 201, the shutter 202, and the image pickup part 203 is prevented from getting dirty or being damaged.

An image processing part 206 performs image processing on the image data from the A/D converter 204 or the image data from a memory control part 207. The image processing includes resizing processing such as predetermined pixel interpolation or reduction, and color conversion processing. The image processing part 206 performs predetermined calculation processing using picked-up image data, and a system control part 208 performs exposure control and distance measurement control based on a calculation result. The image data output from the A/D converter 204 is written into a memory 209 via the image processing part 206 and the memory control part 207 or only via the memory control part 207. The memory 209 stores image data obtained from the image pickup part 203 and converted into digital data by the A/D converter 204 and image data to be displayed on a display part 210. The memory 209 has a storage capacity sufficient to store a predetermined number of still image data, moving image data for a predetermined time, audio data, and the like. The memory 209 also serves as an image display memory (video memory). The memory 209 stores various pieces of information.

A D/A converter 211 converts image data for an image display that is stored in the memory 209 into an analog signal and outputs the analog signal to the display part 210. In FIG. 2, the D/A converter is indicated as "D/A". The display image data written in the memory 209 is displayed on the display part 210 via the D/A converter 211. The display part 210 performs display in accordance with an analog signal from the D/A converter 211 on a display such as an LCD. A nonvolatile memory 212 is an electrically erasable and recordable memory, for example, an EEPROM. The nonvolatile memory 212 stores a control program executed by the system control part 208, operation constants of the control program, and the like.

The system control part 208 controls the information processing apparatus 102 as a whole. The system control part 208 corresponds to an analysis unit, an acquisition unit, a detection unit, and a display control unit. The system control part 208 is, for example, a CPU. A system memory 213 is, for example, a RAM. In the system memory 213, constants and variables for operation of the system control part 208, programs read from the nonvolatile memory 212, and the like, are expanded. By executing the program expanded in the system memory 213 by the system control part 208 as a CPU, each process of the information processing apparatus 102 is realized.

A mode change switch 214, a shutter button 215, and an operation part 217 are operation units for inputting various operation instructions to the system control part 208. The mode change switch 214 switches an operation mode of the system control part 208 to any one of a still image recording mode, a moving image recording mode, and a reproduction mode. There may be modes other than the above in the operation mode. When a shooting preparation instruction (so-called half-press) is given to the shutter button 215, a first shutter switch is turned on, and the first shutter switch signal SW1 is generated. When a shooting instruction (so-called full press) is given to the shutter button 215, a second shutter switch is turned on, and a second shutter switch signal SW2 is generated.

In response to the second shutter switch signal SW2, the system control part 208 starts a series of shooting processing operations from reading a signal from the image pickup part 203 to writing image data into a recording medium 225. Each operation member of the operation part 217 functions as various function buttons by appropriately assigning functions for each scene by selecting and operating various function icons displayed on the display part 210. Examples of the function buttons include a confirmation button, an end button, a return button, an image feeding button, a jump button, a narrowing button, an attribute change button, and the like. For example, when a menu button is pressed, various settable menu screens are displayed on the display part 210. The user can make various settings intuitively using the menu screen displayed on the display part 210 and, a four-way button and a SET button.

The operation part 217 includes a controller wheel 218 and a controller ring 219. The controller wheel 218 is a rotatable operation member and is used together with the direction button when a selection item is designated. For example, the system control part 208 controls each component of the information processing apparatus 102 based on a pulse signal. The system control part 208 can determine an angle, rotation speed, and the like, at which the controller wheel 218 is rotated by the pulse signal. An arbitrary operation member that can detect a rotation operation can be applied to the controller wheel 218. The controller ring 219 is a rotation operation member included in the operation part 217, and can be operated to rotate around an optical axis about a lens barrel. For example, when the controller ring 219 is operated, an electrical pulse signal corresponding to a rotation amount (operation amount) is generated. In addition, when a function switching button of the controller ring 219 included in the operation part 217 is pressed, a menu screen on which a function assigned to the controller ring 219 can be changed is displayed on the display part 210. The controller ring 219 and the controller wheel 218 are used for selecting normal mode items and changing values.

A power switch 220 is a switch for switching between power-on and power-off. A power supply control part 221 includes a battery detection circuit, a DC-DC converter, a switch circuit that switches a block to be energized, and the like. The power supply control part 221 detects, for example, whether or not a battery is attached, a battery type, and a remaining battery level. Further, the power supply control part 221 controls a DC-DC converter based on a detection result and an instruction from the system control part 208, and supplies a necessary voltage to each component including the recording medium 225 for a necessary period. A power supply part 222 includes a primary battery such as an alkaline battery or a lithium battery, a secondary battery such as a NiCd battery, a NiMH battery, or a Li battery, an AC adapter, or the like.

The communication part 223 transmits image data recorded on the recording medium 225 to an external device. The communication part 223 corresponds to a transmission unit. An interface 224 is an interface to which the recording medium 225 is detachably connected. In FIG. 2, the interface is denoted as "I/F". As the recording medium 225, a semiconductor memory, a magnetic disk, or the like, can be applied. A network I/F 226 is a network interface that performs communication via the network 104 under the control of the system control part 208. Through communication via the network I/F 226, the information processing apparatus 102 can communicate with the image analysis server 103 via the network 104. The communication part 223 and the network I/F 226 may be integrated.

Figure 3:
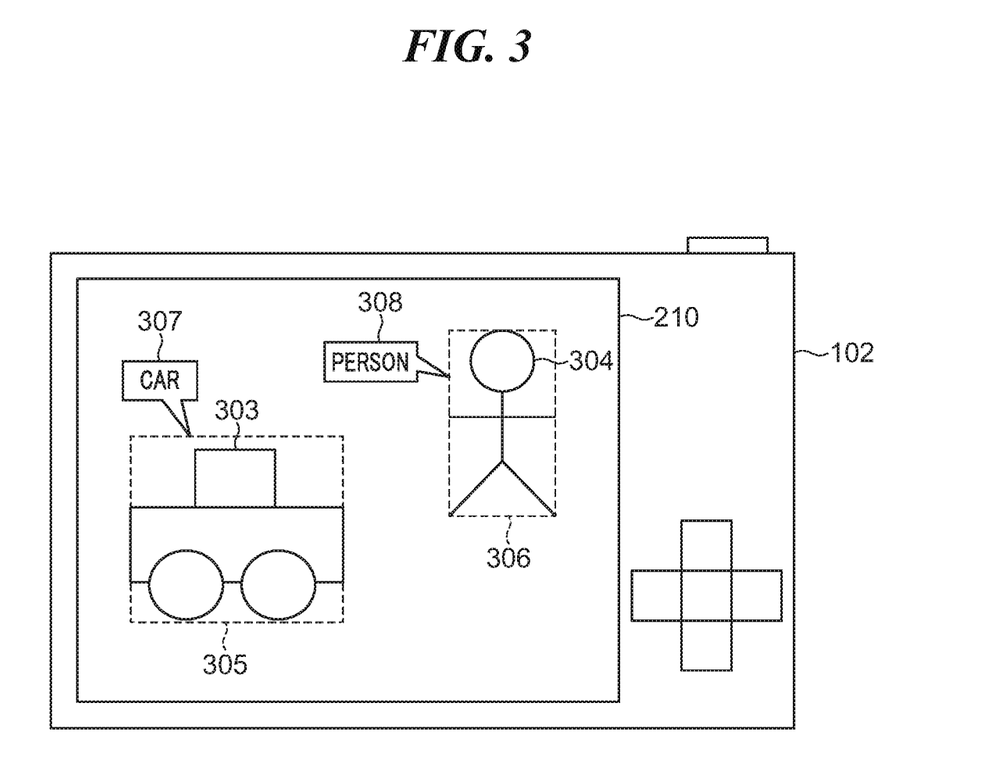
FIG. 3 is a diagram showing an example of a screen displayed on a display part.

FIG. 3 is a diagram showing an example of a screen displayed on the display part 210. In the screen example of FIG. 3, an object 303 and an object 304 are displayed on the display part 210. Each object is, for example, a subject included in the image data. In FIG. 3, the object 303 is a "car". The object 304 is a "person". The types and number of objects are not limited to the example in FIG. 3. The display part 210 displays an image area 305 determined as an area of the object 303 and an image area 306 determined as an area of the object 304. On the display part 210, a tag 307 indicating an attribute of the object 303 and a tag 308 indicating an attribute of the object 304 are displayed. The tag corresponds to attribute information. FIG. 3 shows an example in which the image area 305, the image area 306, the tag 307, and the tag 308 are displayed. However, each image area does not need to be displayed on the display part 210. Further, the attribute of the object may be displayed in a format other than the tag.

Figure 4:
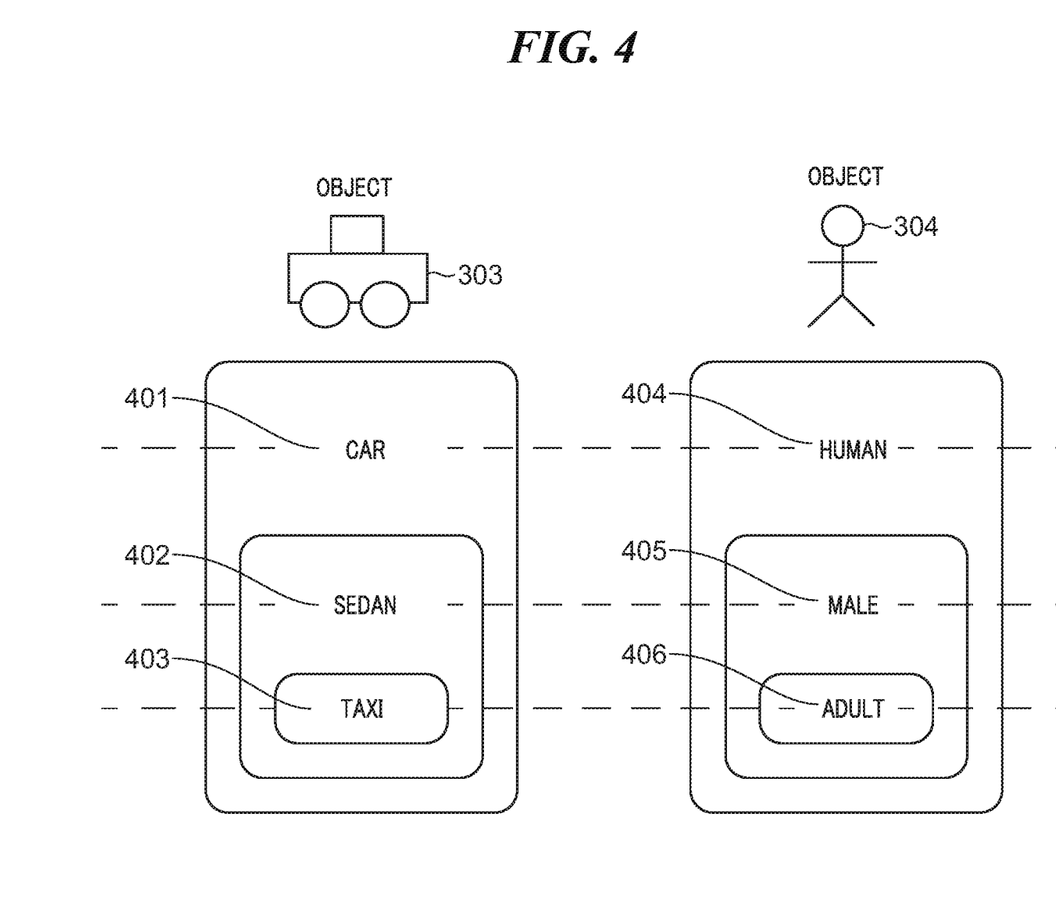
FIG. 4 is a diagram showing a granularity of object recognition by image analysis.

FIG. 4 is a diagram showing a granularity of object recognition by image analysis. A tag 401 indicates an attribute inferred as a coarsest granularity as a result of image analysis of the object 303 in FIG. 3. The tag 401 indicates that the object 303 is inferred as a "car" as an object. A tag 402 indicates an attribute inferred as a medium granularity as a result of image analysis of the object 303. The tag 402 indicates that the object 303 is a "car", and a vehicle type of the car is inferred to be a "sedan". A tag 403 indicates an attribute inferred as the most detailed granularity as a result of image analysis of the object 303. The tag 403 indicates that it is inferred that the car is used for a specific purpose of "taxi" from the color, pattern, accessory, etc., of the object 303.

Similarly, a tag 404 indicates that the attribute of the object 304 is inferred to be "human", as the coarsest granularity as a result of the image analysis of the object 304. A tag 405 indicates that the object 304 is inferred that the gender is "male", as a medium granularity as a result of the image analysis of the object 304. A tag 406 indicates that the attribute of the object 304 is "adult" by inferring the age of the object 304, as the most detailed granularity as a result of the image analysis of the object 304. In the example of FIG. 3, an example in which the granularity is three stages is shown, but the number of stages is not limited to three.

As the granularity increases, the inference accuracy of the object increases. That is, when the above-described granularity is the coarsest, the inference accuracy of the object is the lowest. On the other hand, when the above granularity is the most detailed, the inference accuracy of the object is the highest. Inference of the objects is performed based on an inference model. The inference model may be, for example, a learned model generated by machine learning, a learned neural network system, or the like. The inference of the objects with coarse granularity can be performed using an inference model with a small learning amount, and can be realized even with a device with low processing capability. On the other hand, the inference of the objects with detailed granularity requires the use of an inference model with a large amount of learning, and a device with high processing capability is required. The inference model with a large amount of learning can be obtained, for example, by performing machine learning using a large amount of learning data as an input. When the processing capability of the information processing apparatus 102 is low, it is difficult to infer the objects with detailed granularity. In this case, the information processing apparatus 102 outputs a request for inference processing to the image analysis server 103 and acquires an analysis result (first analysis result) including a result of the inference processing performed by the image analysis server 103. Thereby, even an information processing apparatus with low processing capability can acquire an inference result of the object with detailed granularity.

Figure 5:
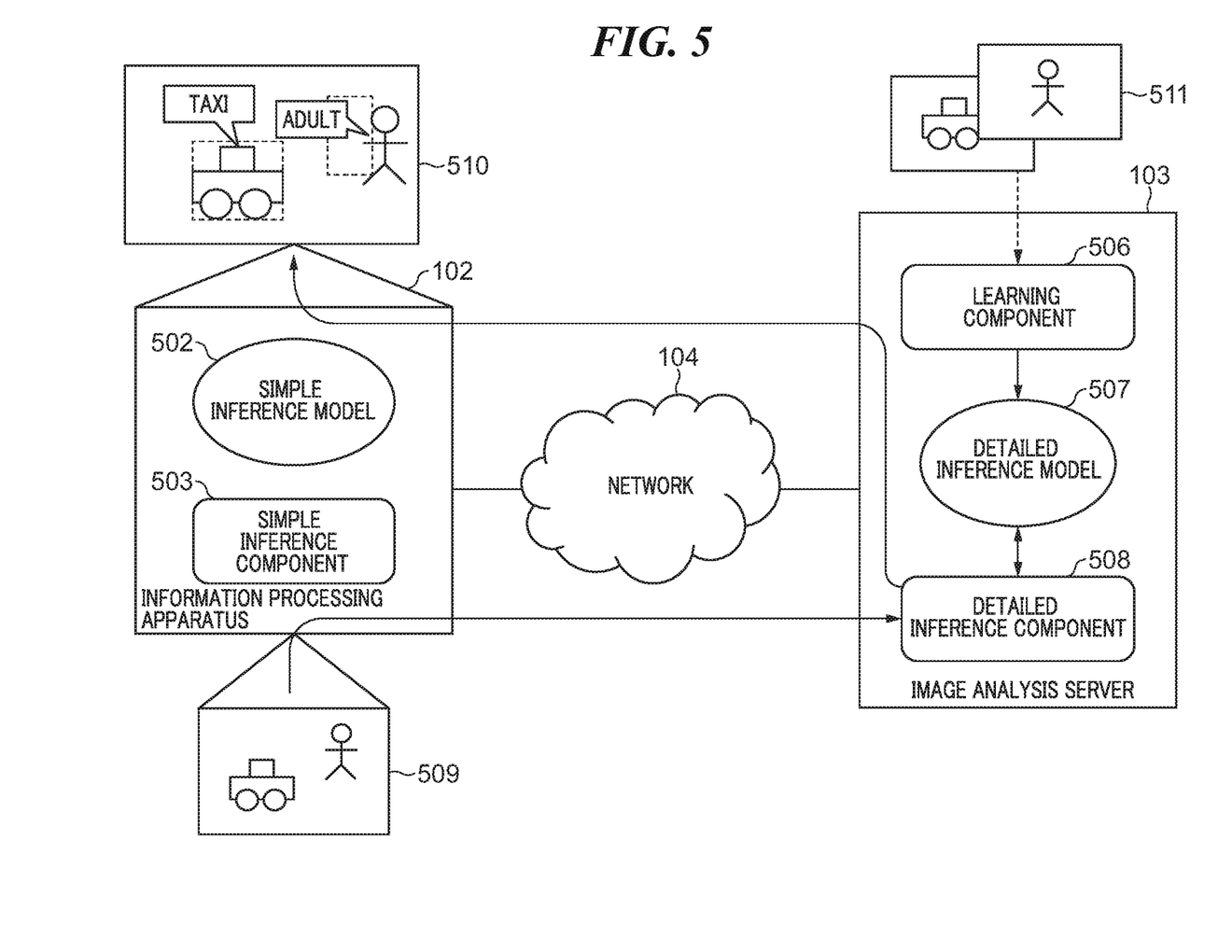
FIG. 5 is a diagram showing a method for image analysis in an online state.

FIG. 5 is a diagram showing a method for image analysis in an online state. The online state is a communication state in which the information processing apparatus 102 and the image analysis server 103 can communicate with each other via the network 104, and indicates that communication has been established. As shown in FIG. 5, the information processing apparatus 102 includes a simple inference model 502 that is a simple inference model and a simple inference component 503 that performs simple inference processing based on the simple inference model. The simple inference model 502 corresponds to a second inference model. The functions of the simple inference model 502 and the simple inference component 503 are realized by the system control part 208 executing a program. The information processing apparatus 102 communicates with the image analysis server 103 while being connected to the network 104 (online state).

The simple inference model 502 is stored in the system memory 213, for example. In this case, the system memory 213 corresponds to a storage unit.

The image analysis server 103 includes a learning component 506 for constructing a detailed inference model 507, the detailed inference model 507, and a detailed inference component 508 that performs inference processing. The detailed inference model 507 corresponds to a first inference model. The detailed inference model 507 is an inference model with higher accuracy (high-performance inference model) than the simple inference model 502. The image analysis server 103 has a CPU, a RAM, and a ROM. A program stored in the ROM is expanded in the RAM, and the CPU executes the program expanded in the RAM. Accordingly, the functions of the learning component 506, the detailed inference model 507, and the detailed inference component 508 may be realized.

The information processing apparatus 102 transmits image data 509 acquired from the image pickup part 203 to the image analysis server 103 via the network 104. The information processing apparatus 102 may transmit the analysis result (second analysis result) analyzed using the simple inference model 502 together with the image data 509 to the image analysis server 103. The image analysis server 103 inputs the received image data 509 to the detailed inference component 508 and executes inference processing. The image analysis server 103 recognizes an object included in the image data 509 through the above-described inference processing, and determines an attribute of the object. The image analysis server 103 transmits the analysis result including the recognized object and attribute information to the information processing apparatus 102. The image analysis server 103 has a high processing capability. In addition, since the image analysis server 103 can secure a processing time due to constant operation, a more accurate detailed inference model 507 can be constructed. Therefore, the image analysis server 103 can obtain the analysis result of the image data with the most detailed granularity. The detailed inference model 507 of the image analysis server 103 is an inference model constructed based on a sufficient learning amount. On the other hand, the learning amount of the simple inference model 502 is less than the learning amount of the detailed inference model 507. For this reason, the accuracy of inference using the simple inference model 502 is lower than the accuracy of inference using the detailed inference model 507. It should be noted that the above explanation is a case when the accuracy is differs between the detailed inference model 507 and the simple inference model 502 due to the difference in the amount of the learning data, but is not limit thereto. For example, an algorithm to be used for generating the inference model from the learning data may differs between the detailed inference model 507 and the simple inference model 502. Further, a scale of a learned neural network system as the detailed inference model 507 may be different from a scale of a learned neural network system as the simple inference model 502.

The information processing apparatus 102 stores the analysis result received from the image analysis server 103 in the memory 209 and outputs the analysis result to the display part 210. Thereby, the analysis result is displayed on the display part 210. In a case when the information processing apparatus 102 receives the analysis result from the image analysis server 103, the simple inference model 502 and the simple inference component 503 of the information processing apparatus 102 are not used. The learning component 506 of the image analysis server 103 can acquire image data as learning data at an arbitrary timing from an external computer, or the like. Example of the learning data includes image data obtained by the image analysis server 103, image data published on the network 104, the image data 509 transmitted from the information processing apparatus 102, and the like. For example, the learning component 506 performs machine learning using the above-described various image data as inputs, and constructs the detailed inference model 507 for each granularity of analysis as a learning result. Any machine learning method such as deep learning can be applied to the machine learning method. The learning component 506 corresponds to a function of constructing an inference model. The learning component 506 of the image analysis server 103 may construct the detailed inference model 507 to gather with the simple inference model 502 with coarse granularity that is a part of the detailed inference model 507.

In FIG. 5, the image analysis server 103 has the learning component 506, but the learning component 506 may be provided by a separate apparatus different from the image analysis server 103. In this case, the image analysis server 103 may always obtain the latest detailed inference model 507 using the learning component 506 included in a separate apparatus. In addition, when the information processing apparatus 102 and the image analysis server 103 are communicably connected (in an online state), the image analysis server 103 transmits a simple inference model with coarse granularity of a part of the latest detailed inference model 507 to the information processing apparatus 102. Thereby, the information processing apparatus 102 can update the simple inference model 502 stored therein to the latest simple inference model.

Figure 6:
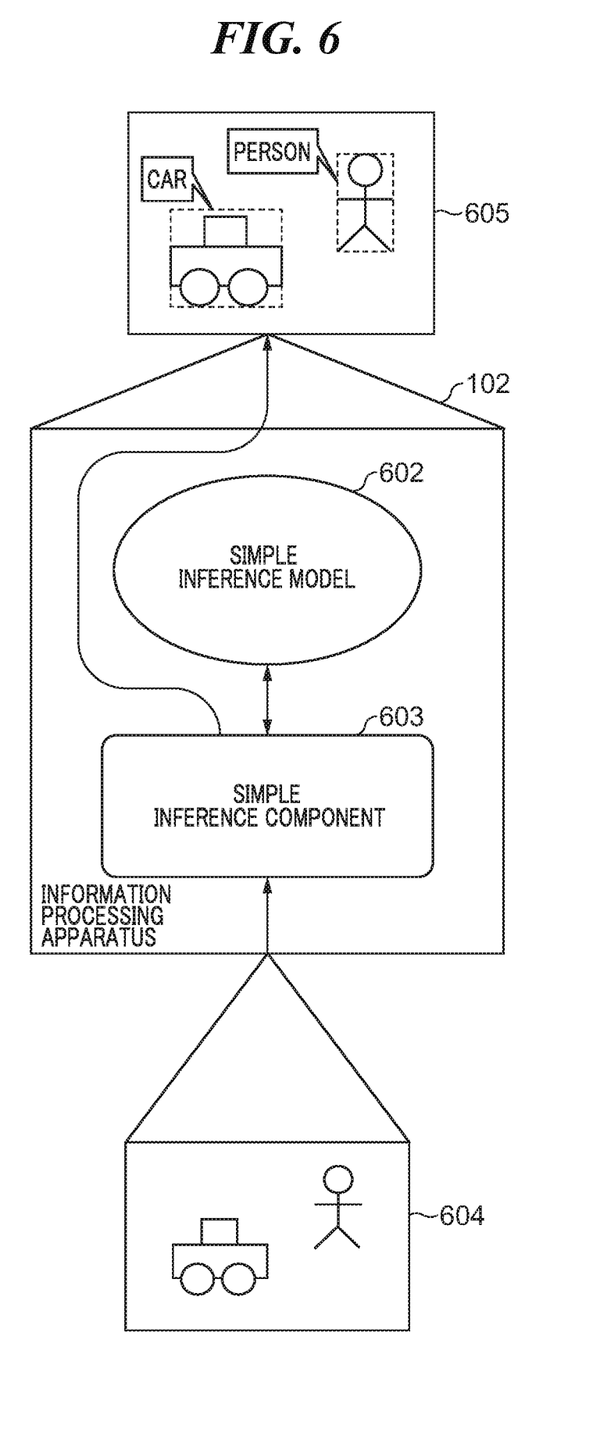
FIG. 6 is a diagram showing a method for image analysis in an offline state.

FIG. 6 is a diagram showing a method for image analysis in an offline state. The offline state is a state where the information processing apparatus 102 cannot connect to the network 104, and the information processing apparatus 102 is in a communication state where communication with the image analysis server 103 is disconnected, and communication is impossible. In this case, the information processing apparatus 102 cannot communicate with the image analysis server 103 via the network 104. The offline state (the state where communication is disconnected) is not only a state where communication between the information processing apparatus 102 and the image analysis server 103 is completely disconnected, but also may be a communication state that is unstable to such an extent that the processing of the present embodiment cannot be normally performed. A simple inference model 602 and a simple inference component 603 in FIG. 6 correspond to the simple inference model 502 and the simple inference component 503 in FIG. 5. As described above, the simple inference model 602 is updated to the latest simple inference model in the online state. The simple inference component 603 performs simple inference processing based on the simple inference model 602. The information processing apparatus 102 inputs the image data 604 acquired from the image pickup part 203 to the simple inference component 603. The simple inference component 603 executes an inference processing using the simple inference model 602, recognizes an object included in the image data 604, and determines an attribute of the recognized object to obtain an analysis result (second analysis result). The simple inference component 603 stores the analysis result in the memory 209 and displays the result on the display part 210. Thereby, even when the communication state is offline, the information processing apparatus 102 can perform simple image analysis by the simple inference component 603.

When the information processing apparatus 102 is in the online state after recognizing objects by simple inference processing in the offline state, the information processing apparatus 102 may transmit the analysis result including the simply recognized object and attribute to the image analysis server 103 together with the image data. The image analysis server 103 reflects the received analysis result on the detailed inference model 507. That is, the detailed inference component 508 can perform detailed granularity analysis using the detailed inference model 507 that reflects the analysis result of the image data using the simple inference model 602 in the offline state. As a result, the time for inference processing by the detailed inference component 508 can be shortened.

Figure 7:
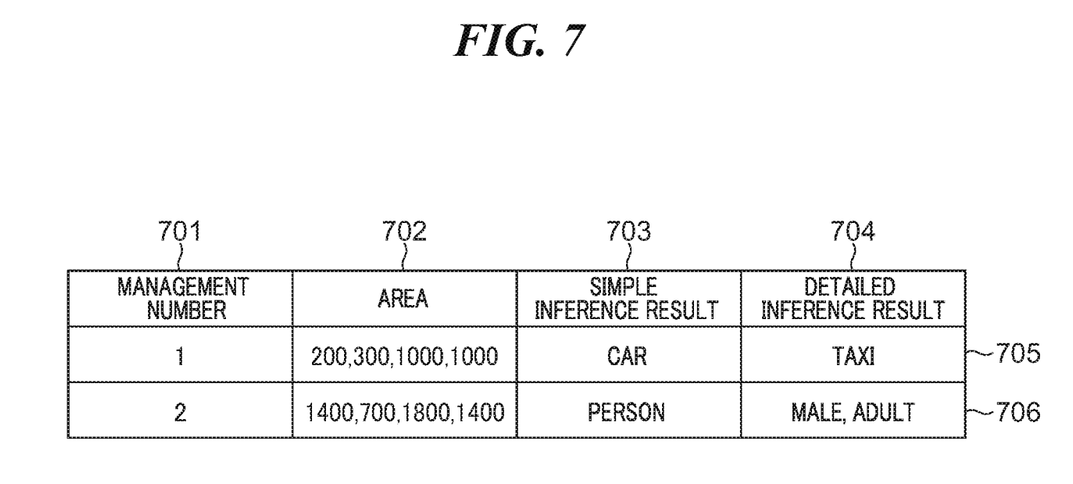
FIG. 7 is a diagram showing an example of a management table.

FIG. 7 is a diagram showing an example of a management table. Information managed in the management table may be managed in a different manner from the table format. For example, the management table is created for each image data, and is stored in the memory 209 as a recording unit by the system control part 208. The management table includes items of a management number 701, an area 702, a simple inference result 703, and a detailed inference result 704. That is, the image data is stored in the memory 209 in association with the simple inference result 703 and the detailed inference result 704. It should be noted that each record may also have an identifier for uniquely specifying image data corresponding to the management table and a file path item indicating the storage location of the image data. The management number 701 indicates a number for managing an object recognized as a result of analysis of the image data. The area 702 shows coordinate information of an area occupied by the recognized object in the image data. The simple inference result 703 indicates an inference result of an object attribute when the simple inference component 603 of the information processing apparatus 102 analyzes image data using the simple inference model 602. The detailed inference result 704 indicates the inference result of an object attribute when the detailed inference component 508 of the image analysis server 103 analyzes image data using the detailed inference model 507. A record 705 is a record corresponding to the management number "1", and a record 706 is a record corresponding to the management number "2".

The record 705 is management information about the image area 305 cut out as an area of the object 303 in FIG. 3. The simple inference result 703 of the record 705 indicates that the object is a "car". The simple inference result 703 is a simple inference result by the simple inference component 603 of the information processing apparatus 102 in the offline state, and indicates that the object is a "car" that is an attribute of a coarse granularity as shown in FIG. 4. The detailed inference result 704 of the record 705 indicates "taxi". The detailed inference result 704 is an inference result of a detailed granularity acquired from the image analysis server 103 in the online state. Therefore, the detailed inference result 704 indicates "taxi" that is an attribute of a detailed granularity as shown in FIG. 4.

The simple inference result 703 of the record 706 indicates "human" that is an attribute of a coarse granularity that is a simple inference result. The detailed inference result 704 of the record 706 indicates "male, adult" that is an attribute of a detailed granularity that is a detailed inference result. FIG. 7 shows an example in which the management table has two records, but the number of records in the management table increases every time an inference processing is performed and an object is recognized. The example of the management table in FIG. 7 includes both the simple inference result 703 and the detailed inference result 704, but may include one of them.

Figure 8:
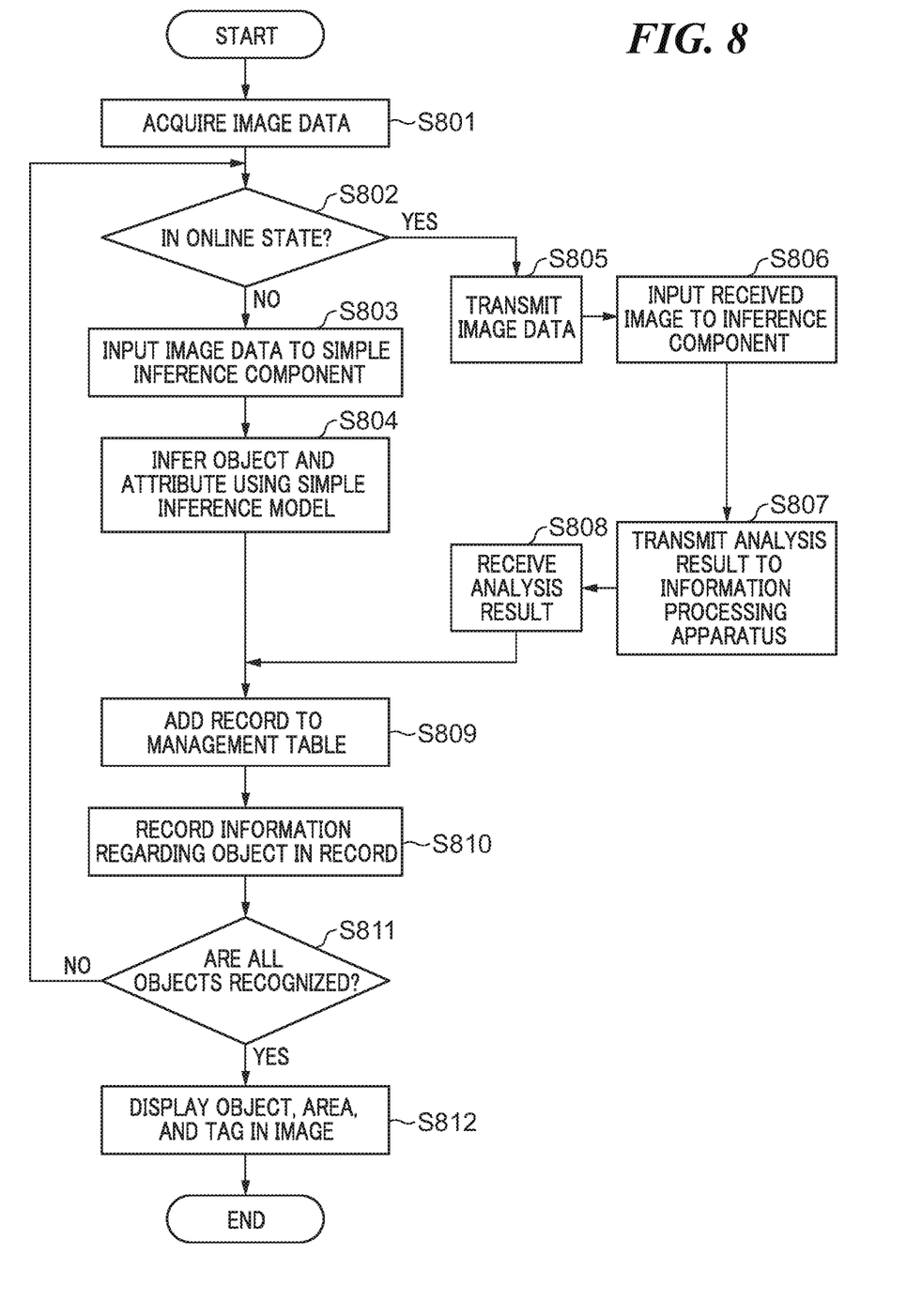
FIG. 8 is a flowchart showing a processing flow of the present embodiment.

FIG. 8 is a flowchart showing a processing flow of the present embodiment. The system control part 208 acquires image data (S801). Analog image data received from the image pickup part 203 is converted into digital image data by the A/D converter 204 (converter). Then, the image processing part 206 performs image processing on the image data. The image data that has been subjected to the image processing is input to the system control part 208. As a result, the processing of S801 is performed. After the processing of S801, the processing after S802 subsequent to is performed. The processing subsequent to S802 may be performed not at the timing when the system control part 208 acquires the image data, but at regular intervals, for example.

The system control part 208 determines whether the information processing apparatus 102 is in an online state (S802). The system control part 208 may perform the determination process of S802 by confirming the state of the network I/F 226 and detecting whether the information processing apparatus 102 is connected to the network 104. When NO is determined in S802, the communication state is in an offline state. In this case, the system control part 208 inputs the image data acquired in S801 to the simple inference component 603 shown in FIG. 6 (S803). The simple inference component 603 analyzes the input image data using the simple inference model 602 of the information processing apparatus 102 shown in FIG. 6, and infers objects and attributes (S804).

When YES is determined in S802, the communication state is in an online state. In this case, the system control part 208 performs control to transmit the image data acquired in S801 to the image analysis server 103 via the network 104 (S805). The image analysis server 103 inputs the image data received from the information processing apparatus 102 to the detailed inference component 508 (S806). The detailed inference component 508 of the image analysis server 103 analyzes the image data using the detailed inference model 507. Then, the image analysis server 103 transmits the analysis result including the object and attribute analyzed using the detailed inference model 507 to the information processing apparatus 102 (S807). The information processing apparatus 102 receives the analysis result transmitted by the image analysis server 103 (S808). The information processing apparatus 102 may perform a process of detecting whether it is in the online state and inquiring the image analysis server 103 to obtain an analysis result, and a process of processing performed inside the information processing apparatus 102, sequentially. Further, the information processing apparatus 102 may perform each of the above processes in parallel.

In S804, the system control part 208 acquires the analysis result analyzed by its own simple inference model 602. The analysis result by the simple inference model 602 is an analysis result with coarse granularity. On the other hand, the analysis result acquired from the image analysis server 103 is an analysis result with detailed granularity. The system control part 208 adds a record for each object to the management table of FIG. 7 described above (S809). At this time, the system control part 208 may record a management number for the added record. The system control part 208 records information about the object in the added record (S810). When the processing of S804 is performed, an analysis result with coarse granularity is recorded in the simple inference result 703. When the processing of S808 is performed, the system control part 208 records the analysis result acquired from the image analysis server 103 in the detailed inference result 704.

The system control part 208 determines whether all the objects included in the image data have been recognized (S811). When NO is determined in S811, the flow moves to S802. When YES is determined in S811, the system control part 208 causes the display part 210 to display an object, an area, and a tag together with image data (S812). The system control part 208 may store tag information as metadata of image data in the memory 209 when performing the process of S812. The system control part 208 may perform post-processing such as selection of a shooting mode and transmission of a shooting result based on the analysis result of the object.

Figure 9:
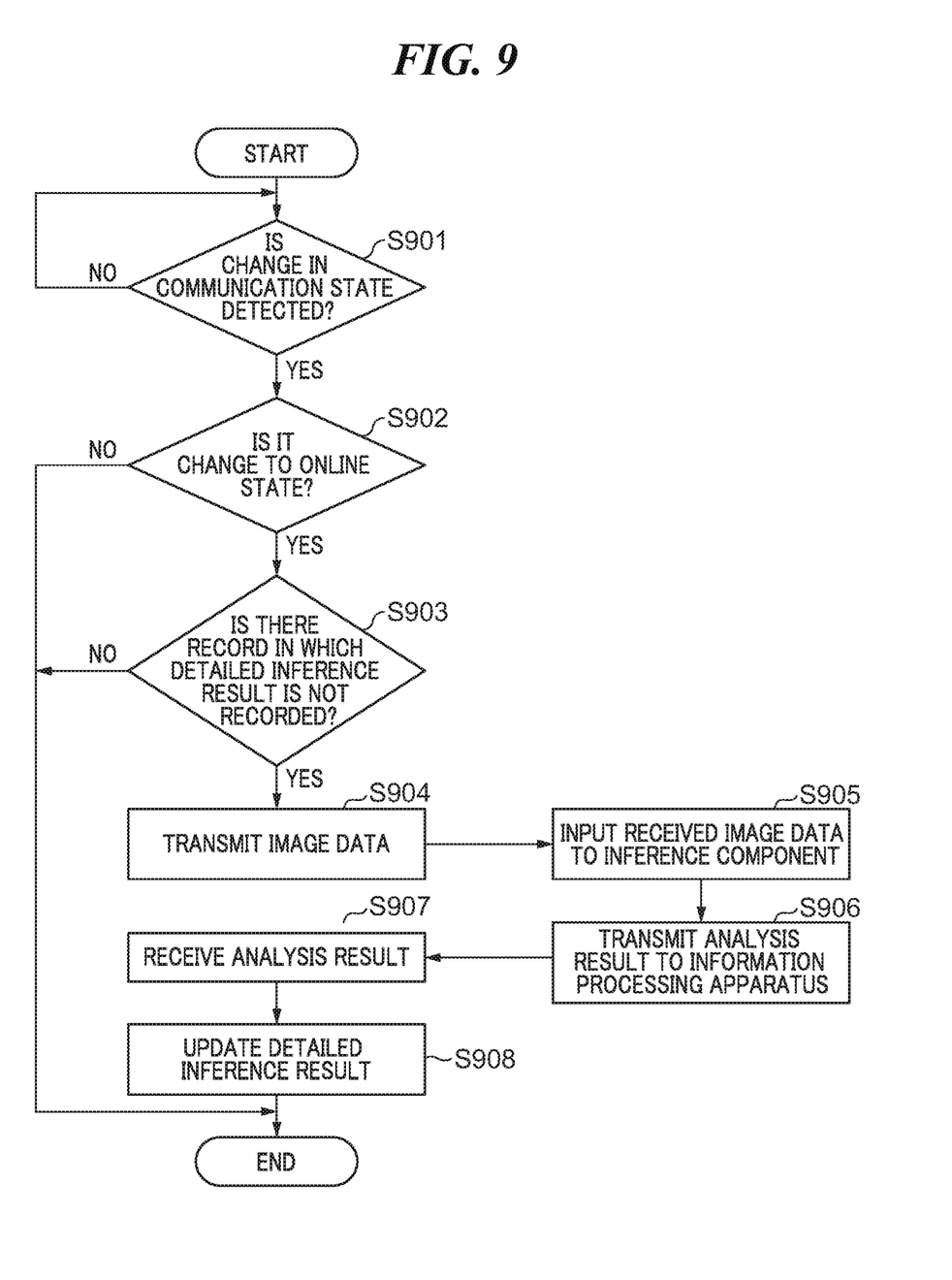
FIG. 9 is a flowchart showing a processing flow of update of a detailed identification result.

FIG. 9 is a flowchart showing a processing flow of an update of a detailed identification result. The system control part 208 determines whether a state change of the network I/F 226 has been detected (S901). The state change of the network I/F 226 is either a change from the online state to the offline state or a change from the offline state to the online state. When NO is determined in S901, the flow returns to S901. When YES is determined in S901, the system control part 208 determines whether the detected change in the communication state is a change from the offline state to the online state (S902). When YES is determined in S902, the system control part 208 refers to the management table and determines whether there is a record in which the simple inference result 703 is recorded but the detailed inference result 704 is not recorded (S903). When YES is determined in S903, the system control part 208 performs control to acquire the image data of the corresponding record and transmit the data to the image analysis server 103 (S904). As a result, the image data is transmitted from the information processing apparatus 102 to the image analysis server 103. The system control part 208 may perform control to transmit the simple inference result 703 to the image analysis server 103 together with the image data.

The image analysis server 103 inputs the received image data to the detailed inference component 508 (S905). The detailed inference component 508 inputs image data to the detailed inference model 507 and performs image analysis. The image analysis server 103 transmits the analysis result to the information processing apparatus 102 (S906). As described above, when the information processing apparatus 102 transmits the simple inference result 703 together with the image data, the simple inference result 703 is reflected in the detailed inference model 507. The detailed inference component 508 may perform analysis using the detailed inference model 507 in which the simple inference result 703 is reflected. The information processing apparatus 102 receives the analysis result transmitted from the image analysis server 103 (S907). The system control part 208 updates the detailed inference result from the received analysis result (S908).

When NO is determined in S902 and NO is determined in S903, the processing of S904 to S908 is not performed. With the above processing, the detailed inference result of the management table is updated since the record of the management table records not only the simple inference result processed in the offline state but also the detailed inference result. When a plurality of records are recorded in the management table, the processing of S904 to S908 is executed for all records. As described above, the information processing apparatus 102 may perform a process of detecting whether it is in an online state and inquiring the image analysis server 103 to obtain an analysis result and a process of processing performed inside the information processing apparatus 102, sequentially or in parallel. Further, the system control part 208 may perform post-processing such as selection of a shooting mode and transmission of a shooting result based on the analysis result of the object.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus capable of communicating with an external device, the apparatus comprising:
    an analysis unit configured to analyze image data and to acquire a second analysis result using a second inference model that is less accurate than a first inference model of an external device when communication with the external device is not possible;
    a transmission unit configured to transmit the image data to the external device when communication with the external device is possible; and
    an acquisition unit configured to acquire, from the external device, a first analysis result obtained by analyzing, using the first inference model, the image data transmitted to the external device by the transmission unit, wherein the first inference model and the second inference model are generated by performing machine learning.

2. The information processing apparatus according to claim 1, further comprising:

a recording unit configured to record the image data in association with at least one of the first analysis result and the second analysis result; and a detection unit configured to detect a communication state with the external device, wherein, when a state where communication with the external device is not possible is changed to a state where communication with the external device is possible, the transmission unit transmits, to the external device, the image data in which the first analysis result is not recorded from among a plurality of the image data recorded in the recording unit.

3. The information processing apparatus according to claim 2, wherein the transmission unit transmits the second analysis result together with the image data to the external device.

4. The information processing apparatus according to claim 1, wherein an analysis result obtained by the analysis performed using the first inference model and the second inference model includes attribute information of an object included in the image data, and a granularity of attribute information included in the second analysis result is coarser than a granularity of attribute information included in the first analysis result.

5. The information processing apparatus according to claim 1, further comprising a display control unit configured to perform control to display the first analysis result or the second analysis result.

6. The information processing apparatus according to claim 1, wherein a learning amount of the second inference model is less than a learning amount of the first inference model.

7. The information processing apparatus according to claim 1, wherein an algorithm used to generate the first inference model is different from an algorithm used to generate the second inference model.

8. The information processing apparatus according to claim 1, wherein the information processing apparatus does not have a function of constructing the second inference model, and the external device has a function of constructing the first inference model.

9. The information processing apparatus according to claim 1, further comprising a storage unit configured to store the second inference model, wherein, when receiving a latest second inference model from the external device, the storage unit updates the second inference model stored in the storage unit to the received latest second inference model.

10. The information processing apparatus according to claim 1, further comprising:

a lens;

an image pickup unit configured to convert an optical image acquired through the lens into an electrical signal;

a converter configured to convert the electrical signal into a digital signal; and an image processing unit configured to perform image processing on the digital signal and output the image data.

11. The information processing apparatus according to claim 1, wherein the first inference model is generated by performing machine learning by the external device.

12. A method for controlling an information processing apparatus capable of communicating with an external device, the method comprising:

acquiring a second analysis result by analyzing image data by using a second inference model that is less accurate than a first inference model of the external device when communication with the external device is not possible;

transmitting the image data to the external device when communication with the external device is possible; and acquiring, from the external device, a first analysis result obtained by analyzing, using the first inference model, the image data transmitted to the external device, wherein the first inference model and the second inference model are generated by performing machine learning.

13. A non-transitory computer-readable storage medium storing a computer-executable program that executes a method for controlling an information processing apparatus capable of communicating with an external device, the control method comprising:

acquiring a second analysis result obtained by analyzing image data by using a second inference model that is less accurate than a first inference model of the external device when communication with the external device is not possible;

transmitting the image data to the external device when communication with the external device is possible; and acquiring, from the external device, a first analysis result obtained by analyzing, using the first inference model, the image data transmitted to the external device, wherein the first inference model and the second inference model are generated by performing machine learning.

* * * * *